(12) United States Patent
Wu et al.

(10) Patent No.: US 11,249,210 B2
(45) Date of Patent: Feb. 15, 2022

(54) GEOPHONE DEPTH CALIBRATION

(71) Applicant: Halliburton Energy Services, Inc., Houston, TX (US)

(72) Inventors: Xiang Wu, Singapore (SG); Mark Elliott Willis, Katy, TX (US); Oscar Augusto Barrios, Conroe, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 442 days.

(21) Appl. No.: 16/062,053

(22) PCT Filed: Dec. 29, 2016

(86) PCT No.: PCT/US2016/069322
§ 371 (c)(1),
(2) Date: Jun. 13, 2018

(87) PCT Pub. No.: WO2018/125167
PCT Pub. Date: Jul. 5, 2018

(65) Prior Publication Data
US 2021/0199829 A1  Jul. 1, 2021

(51) Int. Cl.
*G01V 1/30* (2006.01)
*G01V 1/48* (2006.01)

(52) U.S. Cl.
CPC ............... *G01V 1/305* (2013.01); *G01V 1/48* (2013.01); *G01V 2210/121* (2013.01); *G01V 2210/161* (2013.01); *G01V 2210/6222* (2013.01)

(58) Field of Classification Search
CPC .... G01V 1/305; G01V 1/48; G01V 2210/121; G01V 2210/161; G01V 2210/6222
See application file for complete search history.

(56) References Cited

U.S. PATENT DOCUMENTS

2004/0254733 A1* 12/2004 Basaki ............... G01V 1/286
702/11
2005/0041526 A1   2/2005 Esmersoy et al.
(Continued)

OTHER PUBLICATIONS

Eisner, et al., "Determination of S-wave slowness from a linear array of borehole receivers", Geophys. J. Int. (2009) 176, 31-39 (Year: 2009).*

(Continued)

*Primary Examiner* — Regis J Betsch
(74) *Attorney, Agent, or Firm* — John Wustenberg; C. Tumey Law Group PLLC

(57) ABSTRACT

A method and system for processing a slowness profile. A method may comprise disposing a geophone array into a borehole, positioning the geophone array at a first location within the borehole; discharging a seismic source; positioning the geophone array at a second location within the borehole; discharging the seismic source, wherein the seismic source produces an acoustic wave; recording a vertical seismic profiling dataset, wherein vertical seismic profiling comprises a dataset of recorded acoustic waves by the geophone array at the first location within the borehole and the second location within the borehole; picking a first gap travel time from the vertical seismic profiling dataset; and determining the slowness profile, wherein the slowness profile comprises determining a slowness of the acoustic wave through a formation by the geophone arrays. A well system may comprise a geophone array, comprising a plurality of geophones, and an information handling system.

19 Claims, 12 Drawing Sheets

(56) References Cited

U.S. PATENT DOCUMENTS

| | | | |
|---|---|---|---|
| 2007/0153628 A1 | 7/2007 | Mathiszik et al. | |
| 2008/0316860 A1* | 12/2008 | Muyzert | G01V 1/42 367/25 |
| 2010/0274489 A1* | 10/2010 | Horne | G01V 1/40 702/11 |
| 2016/0146661 A1 | 5/2016 | Martin et al. | |

OTHER PUBLICATIONS

International Search Report and Written Opinion for application No. PCT/US2016/069322 dated Sep. 26, 2017.

* cited by examiner

GEOPHONE DEPTH CALIBRATION

BACKGROUND

Wellbores drilled into subterranean formations may enable recovery of desirable fluids (e.g., hydrocarbons) using a number of different techniques. Knowing the type of formation during drilling operations may be beneficial to operators as a bottom hole assembly traverses through different formations. For example, after the conclusion of drilling operations, a geophone array may be placed within the borehole and measurements may be taken, covering a specific depth range. A vibration source, disposed on the surface, may be activated to cast acoustic waves into formations below. Geophones on the geophone array may detect and allow the recording of the acoustic waves as they traverse and/or reflected through the formation. The velocity at which the geophones detect the acoustic waves may indicate the type of formation the acoustic waves may have traversed through. This process of measuring the velocity of acoustic waves may be repeated many times to form a vertical seismic profile.

A geophone array may be positioned at different sections of the borehole to record and/or produce a slowness profile of the surrounding formations. For example, a single set of geophones on a geophone array, covering a certain depth range, may be disposed in the borehole. The geophone array may be re-positioned at multiple locations within the borehole to cover a different depth range. Thus, a plurality of measurements at different locations within the borehole may form a slowness profile. Conventionally, a slowness profile, or more precisely, an interval slowness profile, which may be the inverse of a slowness profile, may be computed. In the latter context and figures, slowness profiles, instead of slowness profiles, may be presented for depicting the formation velocities. Disposing a geophone array downhole may encounter problems, for example, strain in the cable caused by the weight of the geophone array and cabling, extra slack in the cable between the clamped geophone sensors, and/or poor or inconsistent clamping of the geophone sensors to the borehole, may lead to situations in which there may be inconsistent spacing between measurements positions of the geophone array. This may lead to data which may be skewed with respect to its nominal depth location. For example, the spacing between a geophone array at a first position and the geophone array at a second position may not maintain the spacing found between each geophone on the geophone array. This may lead to the recording of data in the spacing between the first position and the second position that may be larger and/or smaller than the spacing between individual geophones. Additionally, the last geophone on the geophone array at the first position and the first geophone on the geophone array at the second position array may overlap. In this case, different geophones on the geophone array may be recording the same velocity data. Methods of correction and/or calibration may be implemented to take into account these situations. However, determining where calibration and/or correction methods may be implemented within the velocity data may be problematic.

BRIEF DESCRIPTION OF THE DRAWINGS

These drawings illustrate certain aspects of some of the examples of the present invention, and should not be used to limit or define the invention.

DETAILED DESCRIPTION

The present disclosure relates generally to a method for calibrating and/or correcting slowness profiles. More particularly, the methods may correct and/or calibrate slowness profiles computed from geophone array recordings. During a measurement operation, which may take place after drilling operations, a geophone array may be disposed downhole. However, due to downhole conditions, operator error, and/or gravity, a geophone array may be improperly positioned. Calibration and/or correction methods may be implemented to determine the arrangement and or location of the geophone array positions downhole during measurements.

Figure 1:
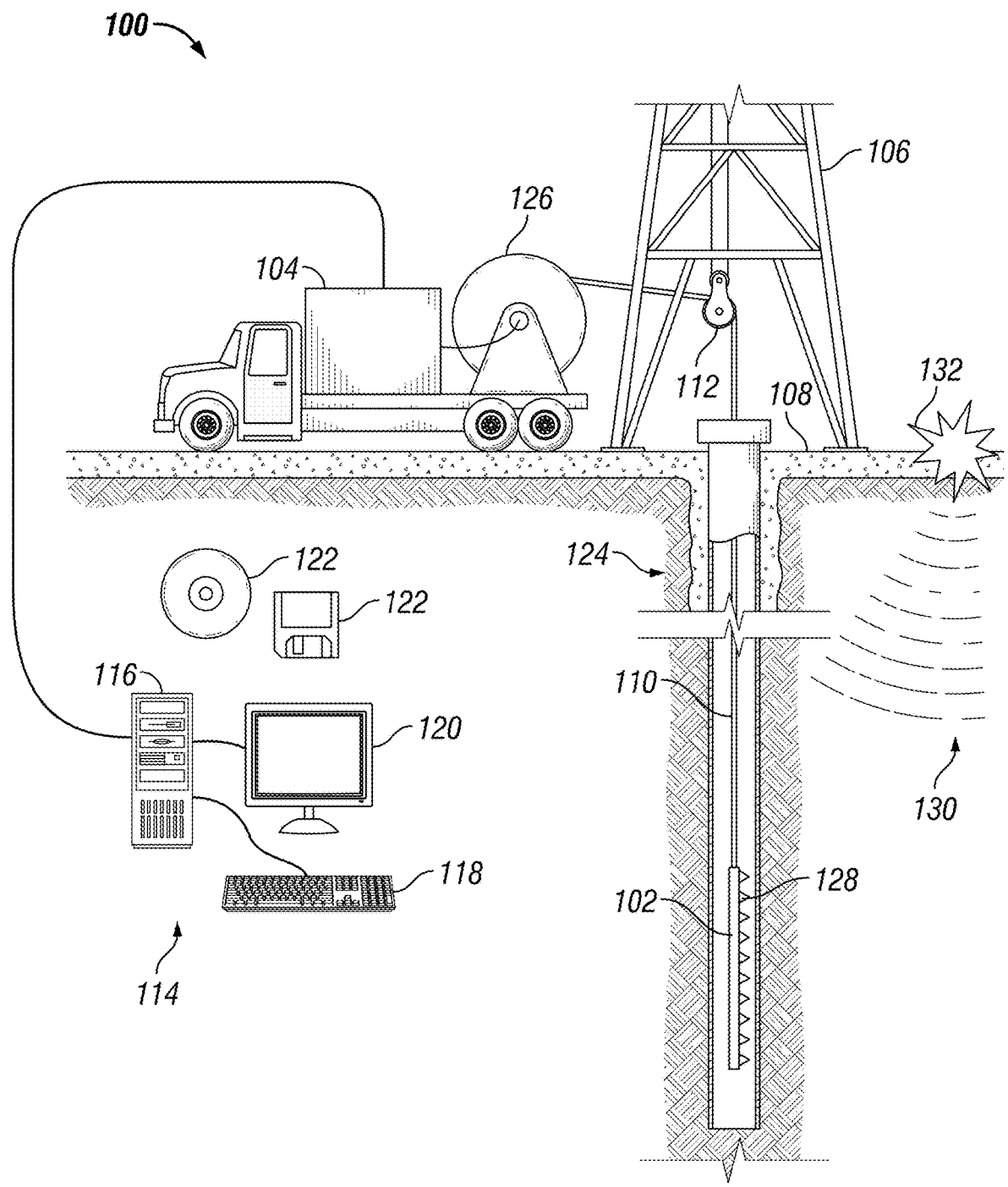
FIG. 1 is a schematic illustration of a well system.

FIG. 1 illustrates a cross-sectional view of a well system 100. As illustrated, well system 100 may comprise geophone array 102 attached to a vehicle 104. In examples, it should be noted that geophone array 102 may not be attached to a vehicle 104. Geophone array 102 may be supported by rig 106 at surface 108. As illustrated, geophone array 102 may be tethered to vehicle 104 through conveyance 110. Conveyance 110 may be disposed around one or more sheave wheels 112 to vehicle 104. Conveyance 110 may be any suitable means for conveyance of geophone array 102, including, but not limited to, a wireline, slickline, coiled tubing, pipe, or the like, which may provide mechanical suspension as well as electrical conductivity for geophone array 102. Information from geophone array 102 may be gathered and/or processed by information handling system 114. It should be noted that information from geophone array 102 may be transmitted to an information handling system 114 on surface 108. Further information may be gathered, stored, and/or processed down hole by information handling system 114 which may be coupled to geophone array 102. Information processed downhole may be transmitted to surface 108 and recorded, displayed, and/or further analyzed. In examples, information may be recorded down hole by an information handling system 114. The recorded information may be retrieved after geophone array 102 has been retrieved from down hole and is disposed on surface 108.

Systems and methods of the present disclosure may be implemented, at least in part, with information handling system 114. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a personal computer 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as various input and output (I/O) devices, such as a keyboard 118, a mouse, and a video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing.

In examples, rig 106 includes a load cell (not shown) which determines the amount of pull on conveyance 110 at the surface of borehole 124. Information handling system 114 may comprise a safety valve which controls the hydraulic pressure that drives drum 126 on vehicle 104 which may reel up and/or release conveyance 110 which may move geophone array 102 up and/or down borehole 124. The safety valve may be adjusted to a pressure such that drum 126 may only impart a small amount of tension to conveyance 110 over and above the tension necessary to retrieve conveyance 110 and/or geophone array 102 from borehole 124. The safety valve is typically set a few hundred pounds above the amount of desired safe pull on conveyance 110 such that once that limit is exceeded, further pull on the conveyance 110 is prevented.

During operation to record a vertical seismic profile, geophone array 102 may comprise a plurality of geophones 128. In examples, geophone array 102 may be placed within borehole 124 and may detect acoustic waves 130 emanating from a seismic source 132. Geophone array 102 may comprise any suitable number of geophones 128, including, but not limited to, between about five to about one hundred. In measurement operations, a geophone array 102 may be disposed at multiple locations along borehole 124 to record acoustic waves 130. In examples, geophone array 102 may be positioned at a first location within borehole 124 and detect acoustic waves 130 at that depth. Geophone array 102 may then be positioned at a second location, in which it may detect acoustic waves 130 from seismic source 132, which may be activated each time geophone array 102 may be re-positioned. The recorded acoustic waves 130 may form a dataset for a vertical seismic profile. During this procedure, an operator may try to position geophone array 102 at each position with a known and constant distance between geophones 128 in the geophone array 102.

Figure 2:
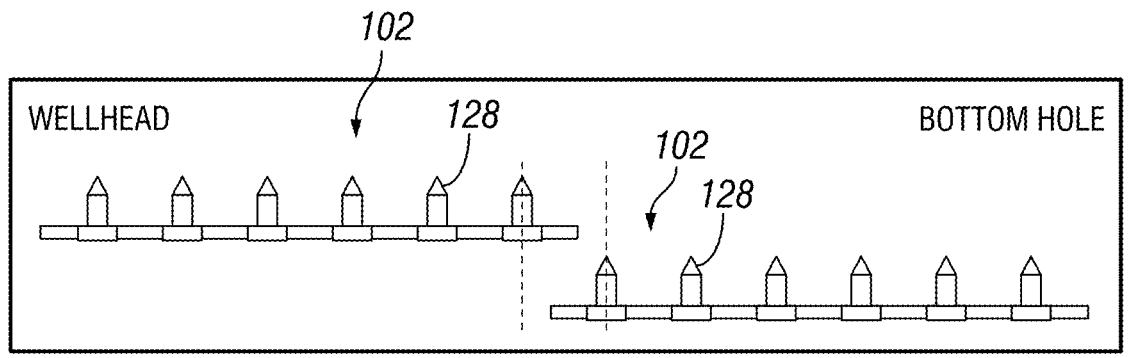
FIG. 2 is a schematic illustration of a geophone array disposed downhole at a first location and a second location.
Figure 3A:
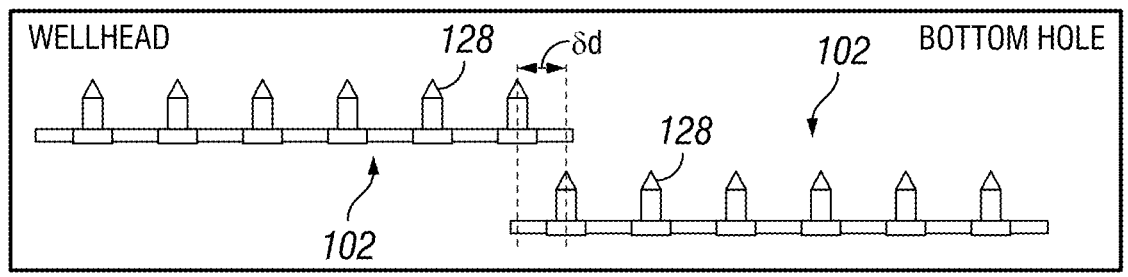
FIG. 3a is a schematic illustration of a first location and a second location of a geophone array overlapping.
Figure 3B:
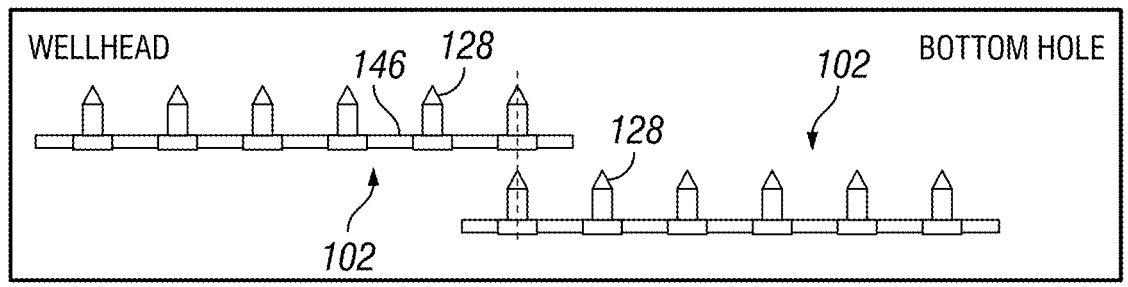
FIG. 3b is a schematic illustration of a first location and a second location of a geophone array that is deviated from overlapping.

FIGS. 2, 3a, and 3b are schematic illustrations showing positioning of geophone array 102 at a first location and then positioning geophone array at a second location. As illustrated in FIG. 2, the spacing between locations may remain constant from one location to the next. It should be noted that there may be a plurality of locations in which geophone array 102 may positioned sequentially. However, due to the gravitational strain which may be caused by the dead weight of geophone array 102, as well as lack of physical connection between the first location and the second location, it may be difficult to accurately fix the spacing between the first location and the second location, such that the spacing between the geophone array 102 at the first location and the geophone array 102 at the second location remains the same as the spacing between geophones 128 on geophone array 102. As illustrated in FIGS. 3a and 3b, geophone array 102 disposed at a first location and at a second location may overlap (FIG. 3b) and/or separate to a point that the spacing between the first and second location may not be equal to the spacing between geophones 128 on the geophone array 102 (FIG. 3a). This may skew the recorded data, which may lead to an improper computing of the slowness. Thus, the data recorded by geophone array 102 may need to be corrected.

Figure 4:
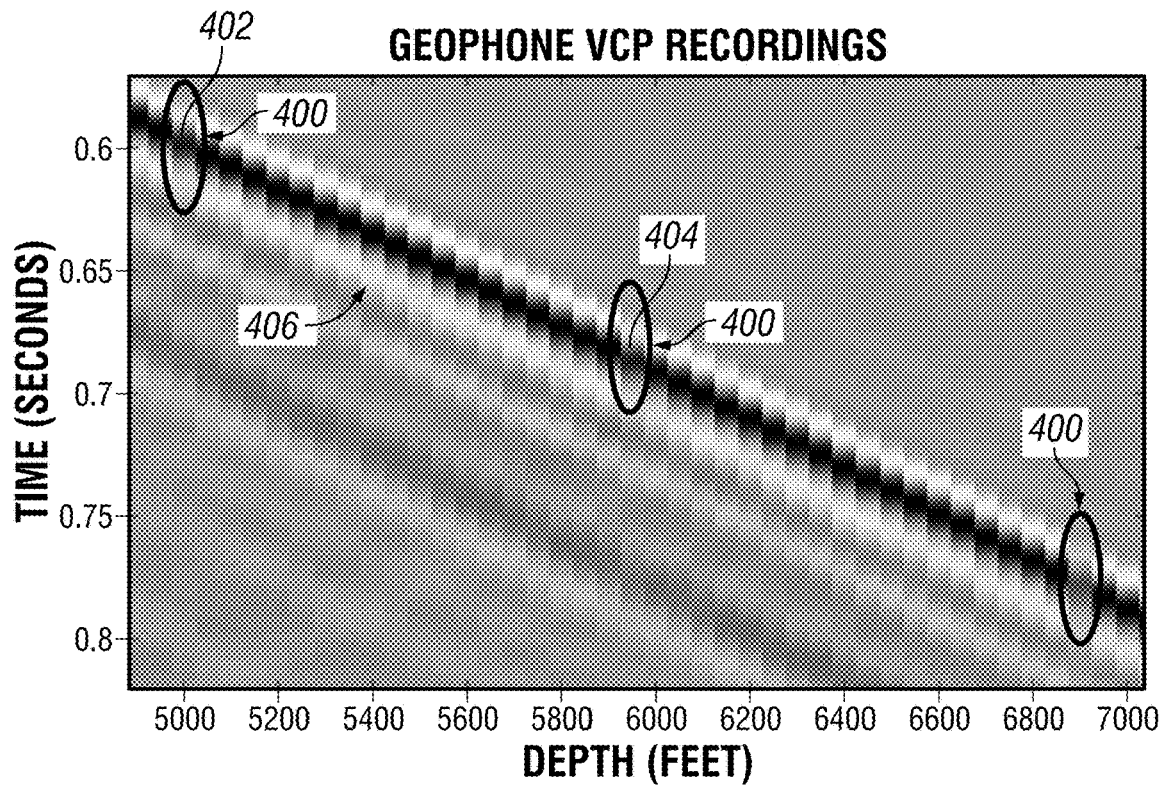
"
FIG. 4 is an example of a graph of a slowness profile.

To determine how to correct the recorded data, the location of where geophone array 102 (referring to FIGS. 3a-3b) may have been disposed downhole may be determined from the recorded data during the analysis process. As illustrated in FIG. 4, recorded data may produce a slowness profile, which may comprise the slowness of acoustic waves 130 (referring to FIG. 1). Within each slowness profile, recorded data may further comprise a gap 400. Gap 400 may illustrate where the measurements of geophone array 102 at a first location ends and the measurements of the geophone array 102 at as the second location begins (Referring to FIG. 2). It should be noted that the measurements between a first break 402 and a second break 404 may be identified as a "first gap" 406. First gap 406 may be defined at the first location in which geophone array 102 (Referring to FIG. 1) may be positioned to sense and/or measure acoustic waves 130. Gaps 400 may be adopted as a reference time point and may be highly spatially consistent by interval slowness from channel to channel, where a channel may represent a single geophone 128 (Referring to FIG. 1).

Figure 5:
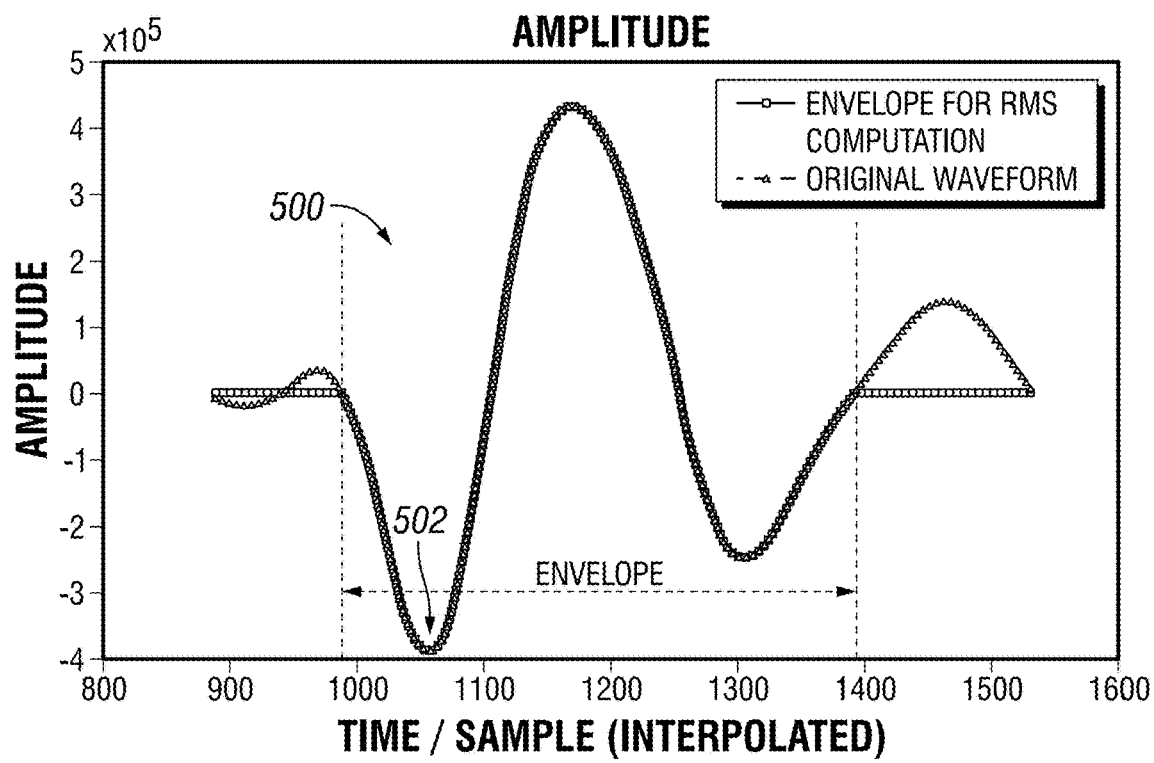
FIG. 5 is an example of a graph of a waveform within a gap.
Figure 6:
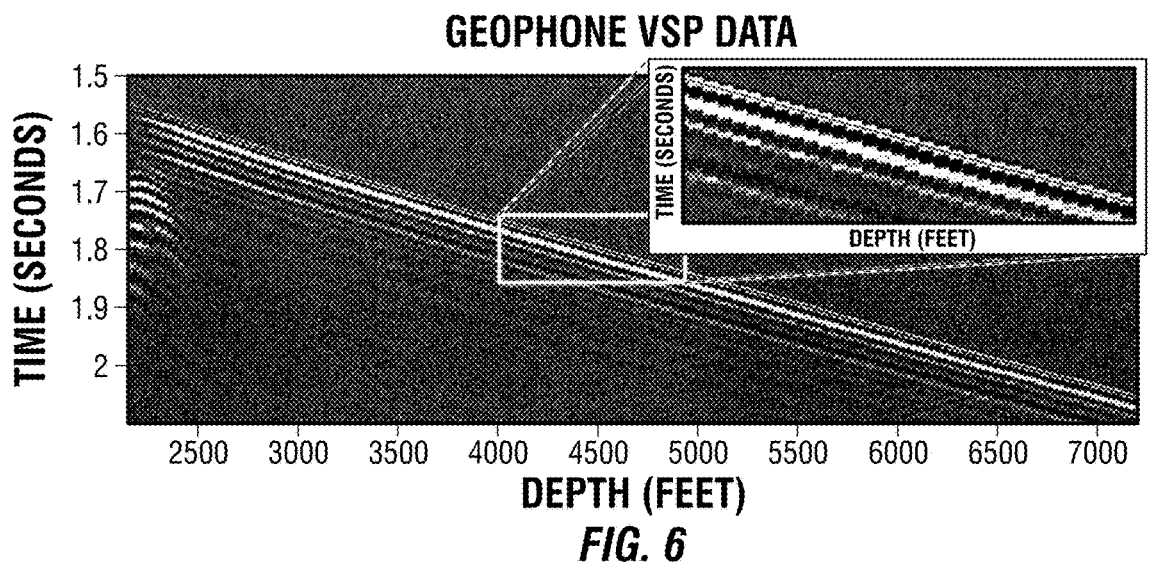
FIG. 6 is an example of a graph of a slowness profile that has been smoothed.

FIG. 5 illustrates a waveform 500 that may describe the picked first gap 406 (Referring to FIG. 4) within recorded data. Waveform 500 may be deviated from minimum phasing, pointing negatively, as indicated by arrow 502. In examples, waveform 500 within first gap 406 may be identified with a correlation-based method. The correlation-based method may comprise manually picking a travel time, where the travel time may be defined as the elapsed time from when the source fires to a specific event, provided the time zero of the recording system is synchronized with the firing of sources. For instance, the travel time of first gap 406 may be the recorded time from time zero to when the first gap 406 occurs. A correlation-based algorithm may be adopted for travel time picking of first gaps 409 in order achieve high resolution and accuracy. In examples, the vicinity of first gap 406 may be extracted along a corridor of sequential manual picks. The corridor may be interpolated to a denser sampling from about 1 ms to about 0.01 ms. A pilot trace may be computed by inter-correlating and stacking a selected range of traces, where the signal-to-noise ratio may be high and wavelets may be consistent. The pilot trace may be correlated with the interpolated trace corridors, which may produce a time lag of each trace. This may distinguish the manual picks from the correlation method picks. Thus, accurate travel time of first gap 406 may be calculated using the equation below:

$$t_{FB}(i) = t_m(i) + \Delta(i) \quad (1)$$

where $t_m(i)$ and $\Delta(i)$ are the travel time of manual picks and the time lag between manual picks and the picks by correlation-based method for channel i, respectively. FIG. 6 illustrates the graph that may be produced from Equation (1).

The interval slowness profile of first gap 406, may be computed by starting with the difference of two first gap travel time, and divided by the depth difference of the two corresponding channels. Specifically, the depth difference may be the difference of the travel distance if the zero offset source may practically deviate from the actual zero offset. The depth computed, discussed below, may be the average depth of two channels. Conventionally, a smoothing window may be applied to derive a reasonable slowness profile, wherein the smoothing operator may be a boxcar (moving average) filter. Proper smoothing needs to be chosen for obtaining interval slowness derived from various measurements. Thus, interval slowness $sln_D(d,s)$ from recorded data may be generally expressed as:

$$sln_D(d, s) = F_s\left(\frac{t_{D+d/2} - t_{D-d/2}}{dist_{D+d/2} - dist_{D-d/2}}\right), \quad (2)$$

where $sln_D(d,s)$ is the slowness computed at depth D, by using depth interval d and smoothing window s. $t_{D+d/2}$ and $t_{D-d/2}$ are the first gap travel time at depth D+d/2 and D−d/2; $dist_{D+d/2}$ and $dist_{D-d/2}$ are source-receiver (travel) distance at depth D+d/2 and D−d/2, respectively. For simplicity, geometric distance may be a good approximation of the true travel distance from the source to receiver for zero offset data. $F_S$ is the smoothing filter of window length s.

The slowness solved for in Equation (2) may allow an operator to determine between two possibilities, a first possibility in which the spacing between measurements at a first location and a second location of geophone array 102 (Referring to FIG. 2) may not be equal to a previous spacing between locations in which measurements may be taken by geophone array 102 or measurement at the first location and the second location overlap each other. This may be determined by the slowness solved for at each geophone 128, specifically the last geophone 700 and a first geophone 702, as illustrated in FIG. 7 and discussed below. Determination between the two possibilities may allow an operator to apply a method for correcting data based upon the measurement points of geophone array 102.

Figure 7A:
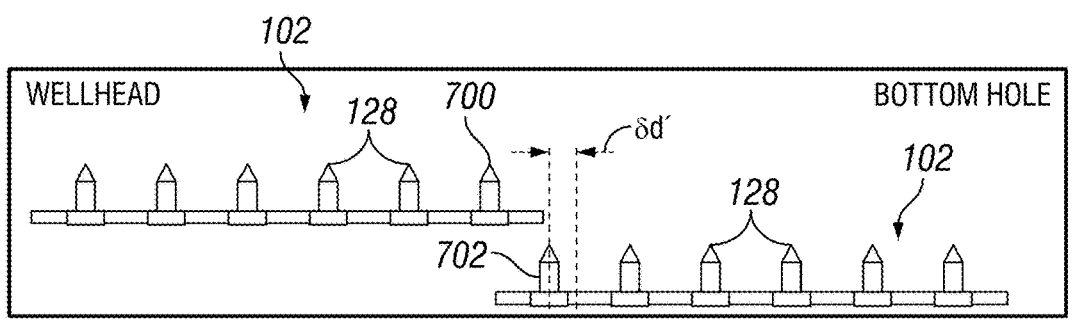
FIG. 7a is a schematic illustration of a first location and a second location of a geophone array overlapping.
Figure 7B:
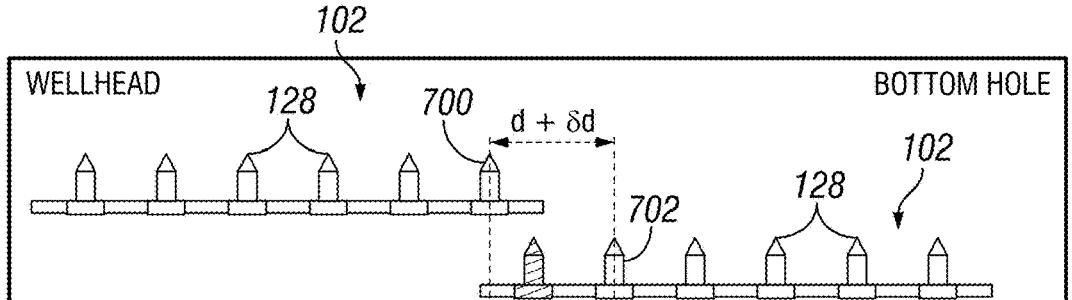
FIG. 7b is a schematic illustration of when a first geophone on a geophone array is removed from processing.
Figure 7C:
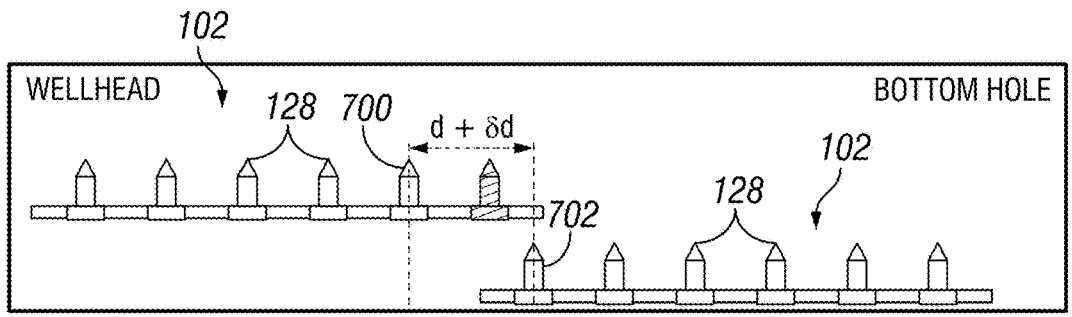
FIG. 7c is a schematic illustration of when a last geophone on a geophone array is removed from processing.

As illustrated in FIG. 7a, in a case where the spacing between the last geophone 700 on geophone array 102 at a first location and a first geophone 702 on the geophone array 102 at a second location may not be separated by the same length as the geophones 128 on geophone array 102. This may skew the slowness profile because the data recorded between the last geophone 700 and the first geophone 702 may be of a distance larger and/or smaller than the distance between geophones 128 on geophone array 102, thus measurements between the last geophone 700 and the first geophone 702 may become outliers of the slowness profile, described below, as the remaining geophones 128. Correcting the slowness profile between the last geophone 700 and the first geophone 702 may be determined as described below. In examples, the length for retraction (i.e., the length of movement from a first location to a second location) of geophone array 102 may be set to the length of geophone array 102, thus adjacent measurements by geophones 128 may be optimized if the space between measurements is with a fixed channel. Additionally, formations beneath the surface of the earth may be stochastic, in terms of stratigraphic structures and/or formations. Therefore, the properties and/or reflectors of formations may naturally follow a Gaussian distribution, with a standard deviation. Such properties may refer to the slowness of formation layers. However, if the properties may be miscalculated and/or erroneously measured, the Gaussian distribution may be distorted, and the standard deviation of the distribution may be altered. Determining the Gaussian distribution may provide a method for correcting depth measurements of geophone array 102, where the stochastics of the slowness of formation may be considered. For example, if δd' and/or δd, which is defined as difference between the actual and the ideal depth of terminal geophones, e.g., the first geophone 702 in geophone array 102 at a second location (shown in FIGS. 7a-7c), is non-zero, the slowness computed between geophone array 102 measurements may deviate from the actual slowness, where the actual slowness may follow a Gaussian distribution.

Figure 8:
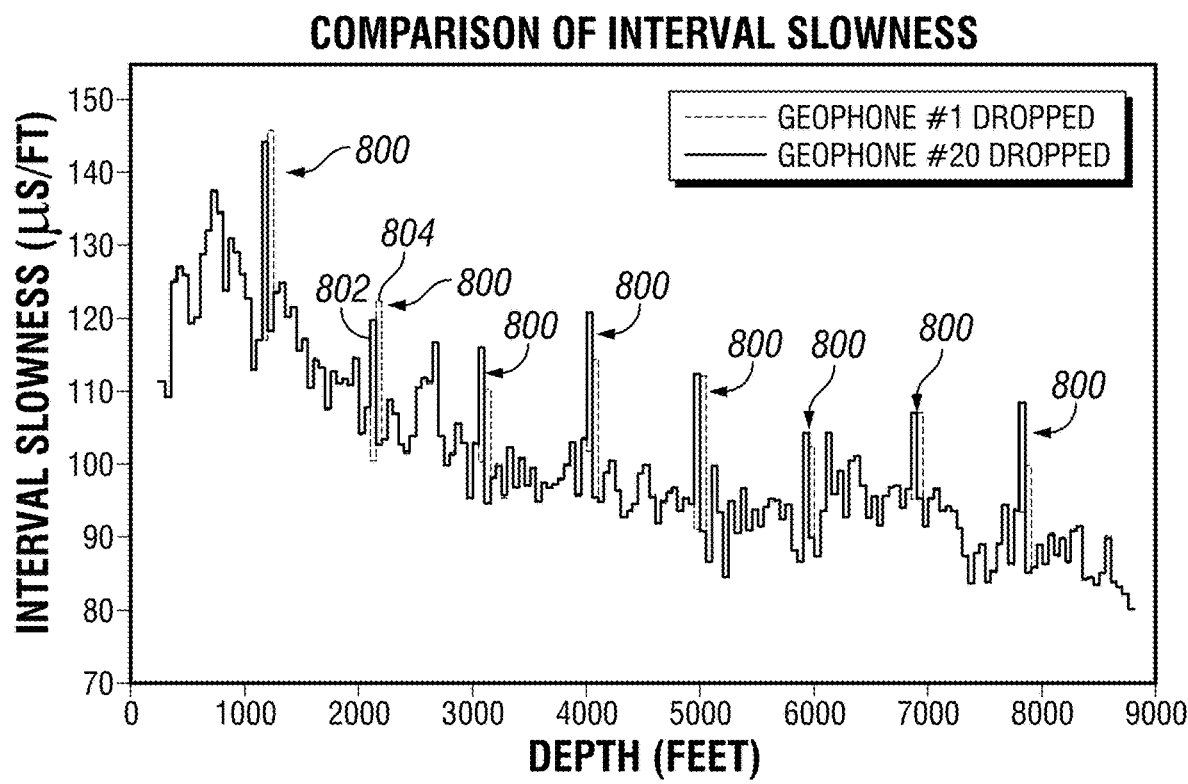
FIG. 8 is an example of a graph of measured slowness through a formation.

FIG. 8 illustrates a graph of measured slowness through a formation (referring to FIG. 1) at different depths within formations. Spikes 800 may indicate errors in slowness measurement. In examples, spikes 800 may be identified by locating the known depths at which geophone array 102 (Referring to FIG. 1) may be moved from a first position to a second position. Within the depth range, spikes 800 may be areas within the data that may not adhere to a Gaussian distribution. For example, taking into consideration the stochastics of the slowness profile the spatial derivative of interval slowness, a spike 800 may be identified. Using the derivative of the slowness rather than the slowness itself may be beneficial as the derivative metric has an automatic de-trending capability, and the standard deviation of the derivative only has a factor of $\sqrt{2}$ to that of the original data stream. Thus, the spatial derivate of the interval slowness may be identified as $S_D^{GEO}$, as the quantity for the below equation.

$$S_D^{GEO} = \frac{\partial s\ln_D^{GEO}}{\partial D} \approx \frac{s\ln_{D+25}^{GEO} - s\ln_{D-25}^{GEO}}{50} \quad (3)$$

The 50-feet spacing between adjacent geophones 128 (referring to FIG. 1) may be presumed as appeared in the denominator of equation (3), and may change to a different number if the spacing between geophones is different. "25" may then change to half of the corresponding spacing. It may be determined that there may be two unusual data points, illustrated as item 802 and item 804 for a single spike 800 within a slowness profile. This may be from either dropping the first geophone 702 (Referring to FIG. 7a) in geophone array 102 at the second location or the last geophone 700 (Referring to FIG. 7a) in geophone array 102 at the first location, which may mimic a channel spacing between locations of geophone arrays 102. Therefore, computing the standard deviation of the spatial derivative of interval slowness $S_D^{GEO}$ without taking into account unusual data points due to spikes 800, denoted as $\sigma_S$, and that with the unusual data points, denoted as $\sigma'_S$. In examples, the stochastic point of view, $\sigma'_S \approx \sigma_S$, if there is no spike 800 in the slowness profile.

Additionally, to constrain the problem, implementing a mean depth shift $\langle \delta d \rangle$ at each first geophone 702 in geophone array 102 at the second location, the slowness between two geophones 128 may be computed by:

$$s\ln_D^{\prime TERMINAL\_GEO} = \frac{t_{D+25+\langle \delta d \rangle} - t_{D-25}}{dist_{D+25+\langle \delta d \rangle} - dist_{D-25}} \quad (4)$$

The standard deviation of $S_D^{GEO}$ with all data points may be computed as $\sigma'_S(\langle \delta d \rangle)$. The actual depth of geophones 128 in geophone array 102 at a second location onwards may accumulate the depth corrections above it. Optimal $\langle \delta d \rangle$ values may be obtained by satisfying one of the following conditions:

$$\begin{cases} \langle \overline{\delta d} \rangle = \arg\{\min_{\langle \delta d \rangle} \sigma'_S(\langle \delta d \rangle)\} \\ \langle \overline{\delta d} \rangle = \arg\{\sigma'_S(\langle \delta d \rangle) \approx \sigma_S\} \end{cases} \quad (5)$$

where arg{·} denote solving for the solution of the parameter which satisfies the equation and/or optimizes the objective function within the brace.

Figure 9A:
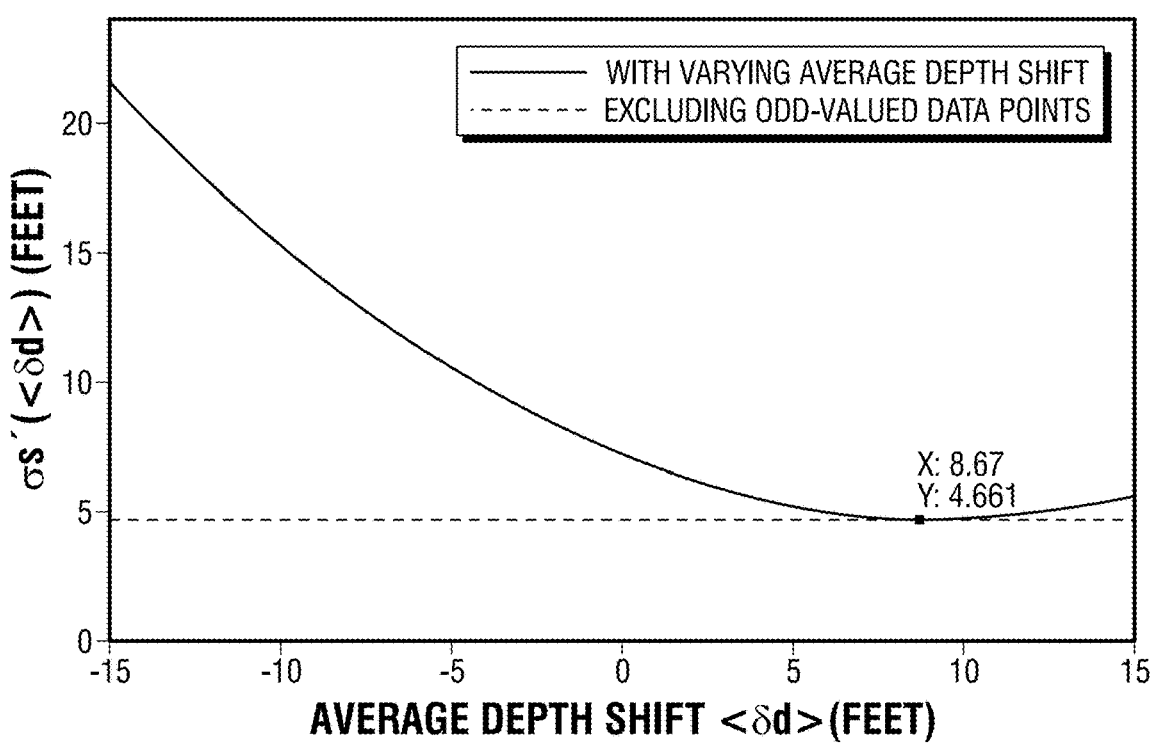
FIG. 9a is an example of a graph of determining an optimal value.
Figure 9B:
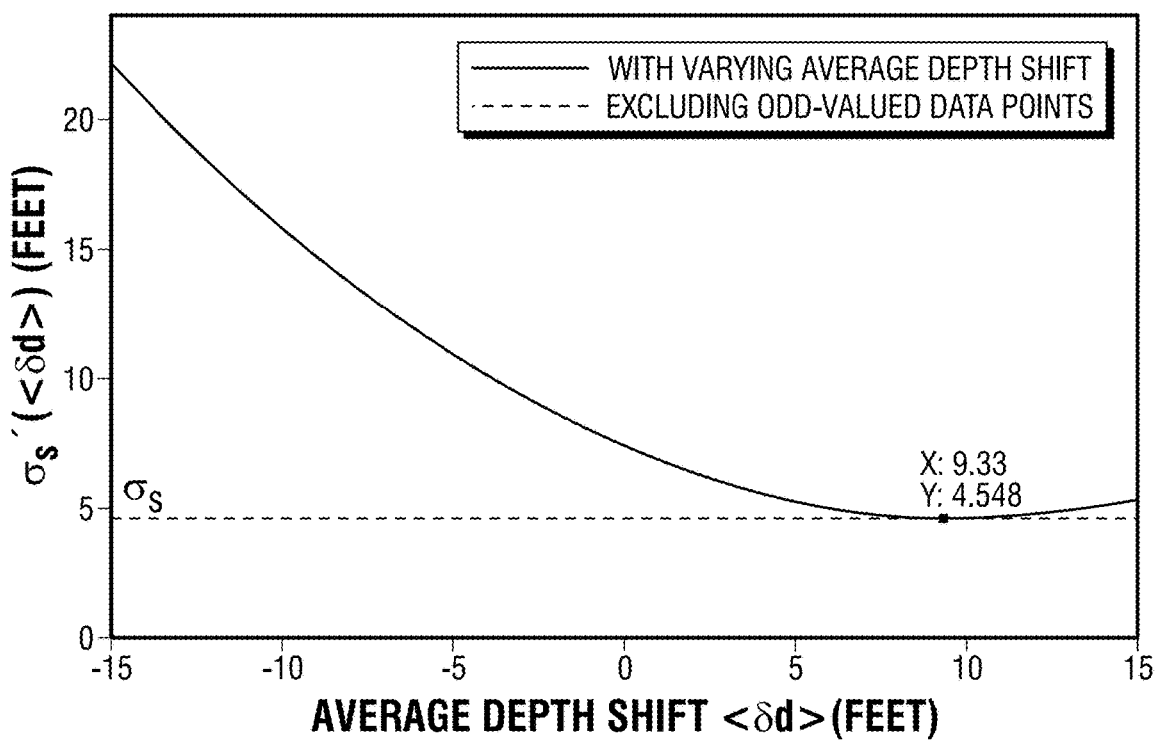
FIG. 9b is an example of another graph of determining an optimal value.
Figure 10A:
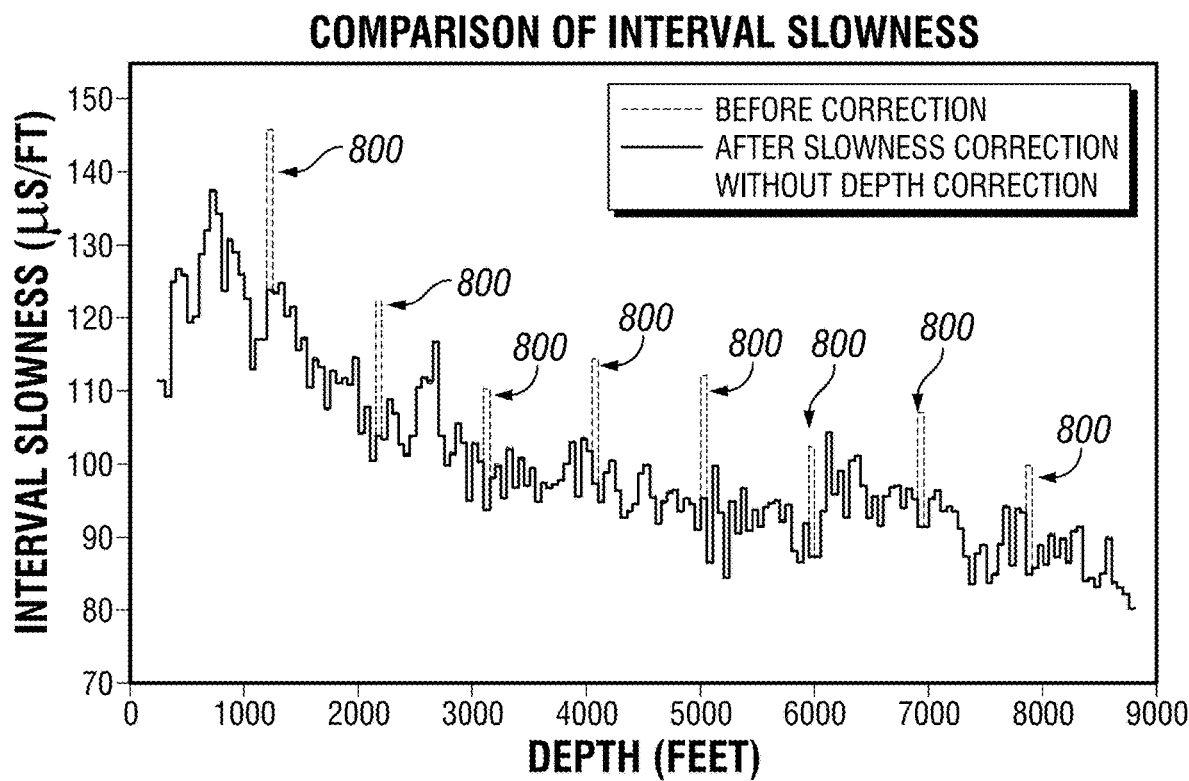
FIG. 10a is an example of a graph of slowness correction without depth correction.
Figure 10B:
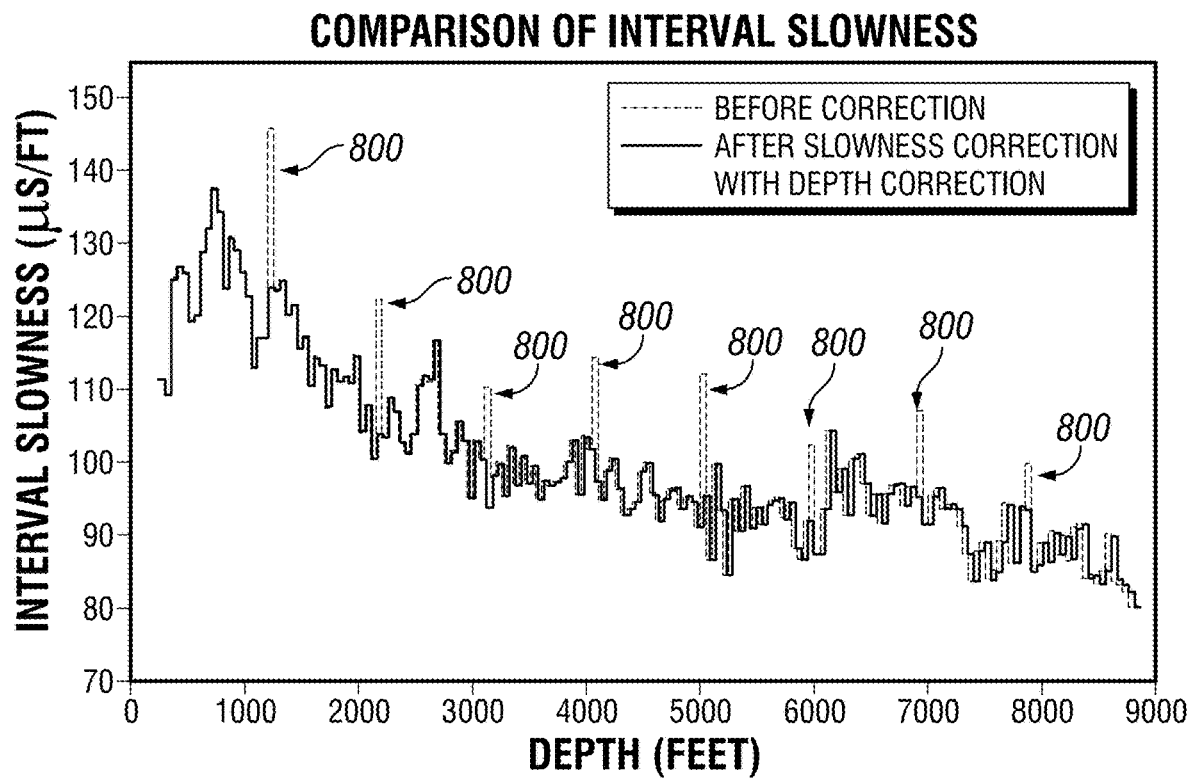
FIG. 10b is an example of a graph of slowness correction with depth correction.
Figure 10C:
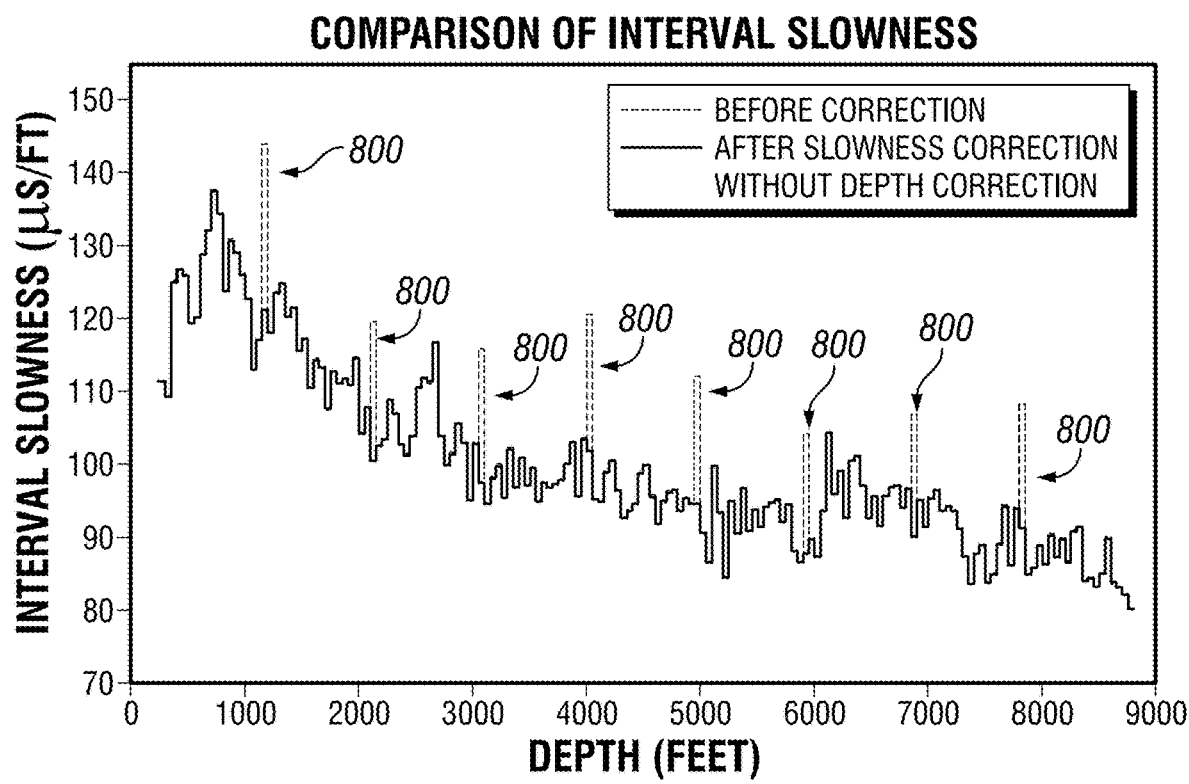
FIG. 10c is another example of a graph of slowness correction without depth correction.
Figure 10D:
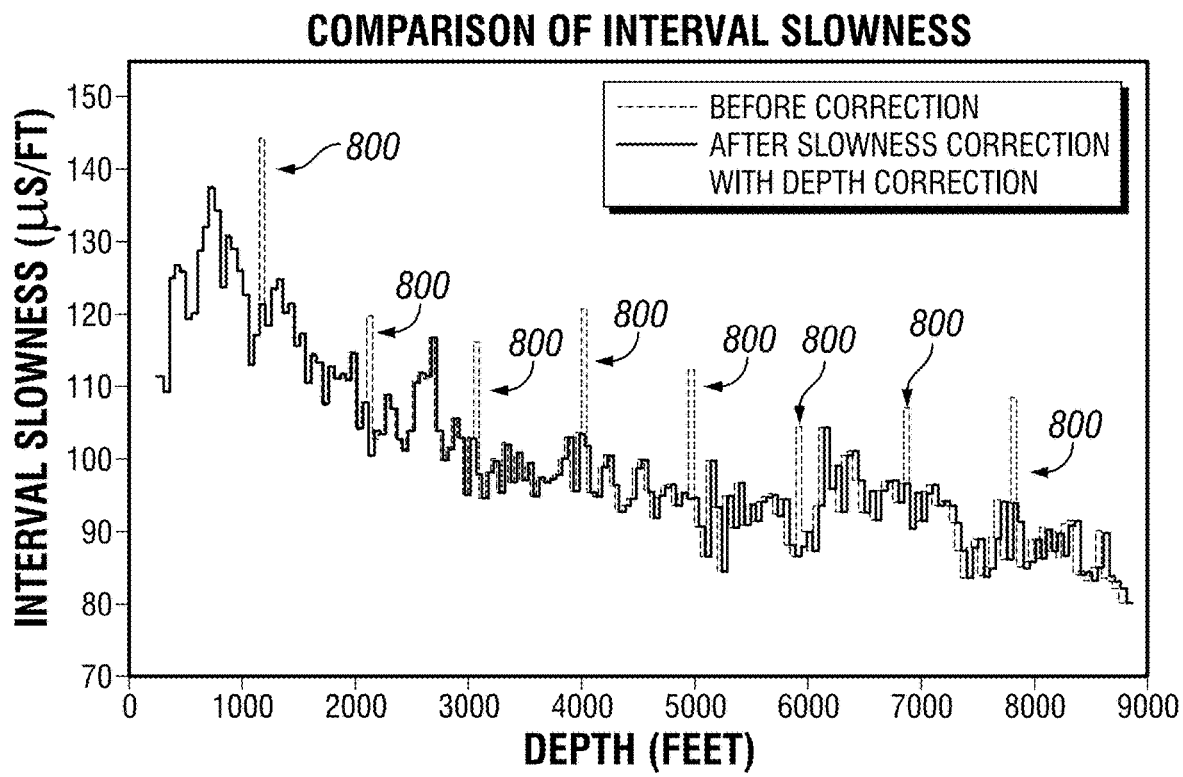
FIG. 10d is another example of a graph of slowness correction with depth correction.

FIGS. 9a and 9b illustrate optimal values $\langle \delta d \rangle$ taking into consideration varying depth shift and the derivative of slowness found using Equation (4) above. FIGS. 9a and 9b illustrate the change of $\sigma'_S(\langle \delta d \rangle)$ with regard to $\langle \delta d \rangle$ for the two cases where a first geophone 702 data and a last geophone 700 data (Referring to FIGS. 7b and 7c) may be removed from calculations, respectively. The data sets from a first geophone 702 and a last geophone 700 may be removed in separate calculations to determine the difference in measurements between what the first geophone 702 and the last geophone 700 may have recorded. In examples, it may be found that the two conditions in objective function (5) may result in a common solution of $\langle \delta d \rangle$. As shown in FIGS. 9a and 9b, the line representing standard deviation may reach minimum as it approaches the line representing the standard deviation of $S_D^{GEO}$ when removing unusual data points from the calculations, such as $\sigma_S$. Hence, picking the first objective function as to obtain the optimal values of $\langle \delta d \rangle$ since it provides single solutions. The optimized value may indicate the average depth shift required to correct recorded slowness data. In examples the optimal average depth shift $\langle \overline{\delta d} \rangle$, may be used in computing the depth after correction, and the slowness may then be calculated by Equation (2) and (4). FIGS. 10a-10d shows the slowness correction with this approach for situations where either the first geophone 702 may be dropped or the last geophone 700 (Referring to FIGS. 7b and 7c) may be dropped. FIGS. 10a and 10c show slowness correction without depth drifting. In both cases, spikes 800 (Referring to FIG. 8) may be suppressed without touching the normal-valued slowness, which may indicate that the optimum standard deviation may be within a reasonable range, (i.e., the average depth shift, and the slowness profiles). FIGS. 10b and 10d show the corresponding slowness correction after depth correction for the two cases. The depth shift may not be severe in the shallow channels, but the accumulative effect makes the deep channels drift significantly.

Figure 11:
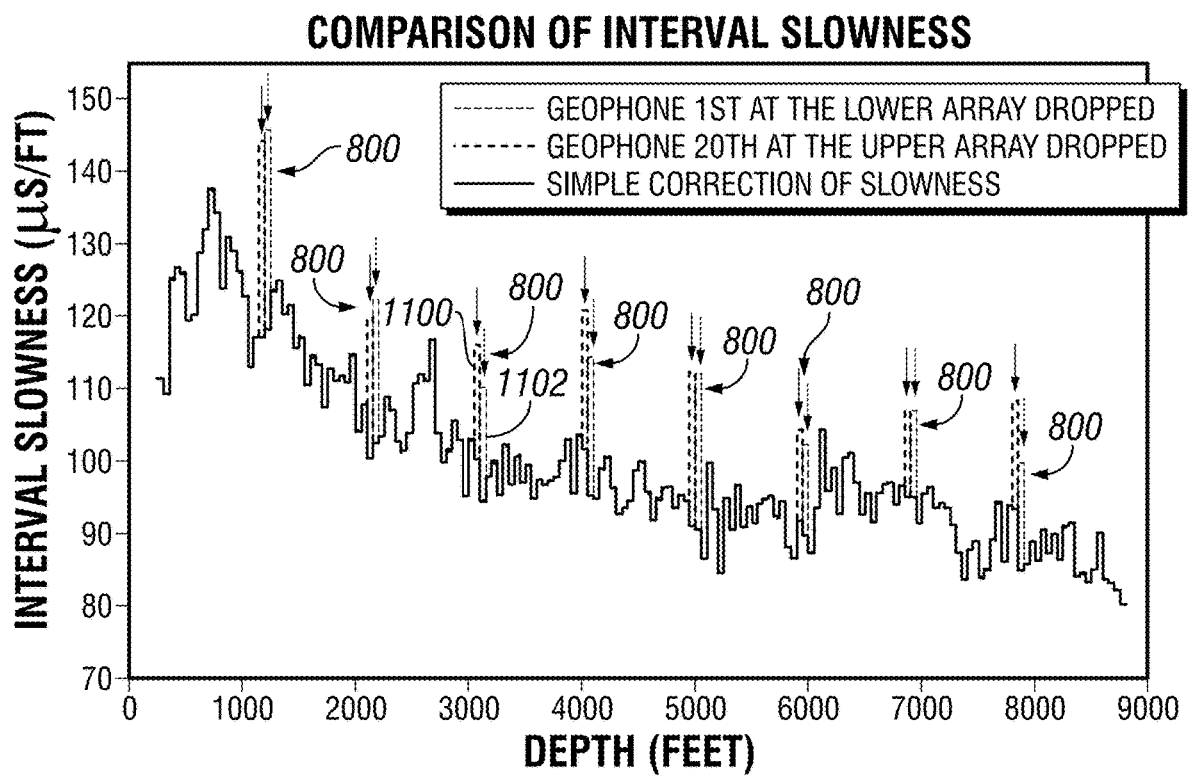
FIG. 11 is an example of another graph of measured slowness through a formation.

As discussed above, there may be an additional case in which slowness data may be skewed. As illustrated in FIG. 3b, a conterminous setup between adjacent measurements of geophone array 102 may be when at least a portion of geophone array 102 at a first location may overlap the measurements of geophone array 102 at a second location. In examples, slowness measurements may be from each geophone 128 disposed downhole, and to correct slowness data in this case, data recorded by an overlapping geophone 128 may be removed during the processing. This may allow for two datasets, from which two slowness profiles may be derived, where one data set may be the removal of an overlapping geophone 128 on geophone array 102 at the first location (Referring to FIG. 7c) and the second data set may be the removal of overlapping geophone 128 on the geophone array 102 at the second location (Referring to FIG. 7b). If δd, as described above, is non-zero, the slowness at the overlapped area may deviate from the actual slowness. As illustrated in FIG. 11, the slowness computed in the situations show very similar behavior except for the overlapped channels, which may produce neighboring spikes 800 (Referring to FIG. 8). In examples, a first data set 1100 may comprise a elevation relative to the normal slowness at the same point may be about identical for a second data set 1102, which may indicate the assumption that there may be minimal difference of the channel spacing, (i.e. there may be overlapping between a first location and a second location of geophone array 102). Determining the location of a spike 800 may follow the same method described above. Note that determining a spike 800 and slowness computation in the two situations may be independent.

Figure 12:
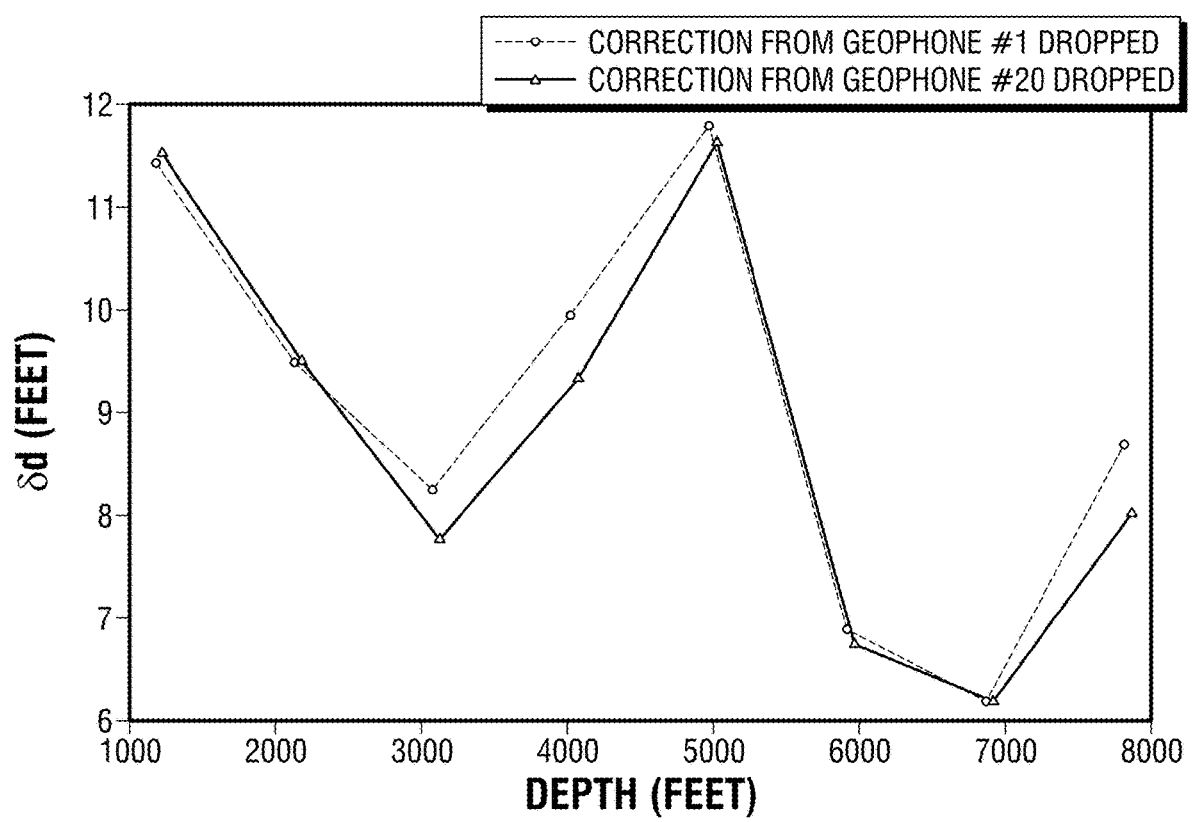
FIG. 12 is an example of another graph of measured values without recorded slowness from a last geophone or a first geophone.

Correction to the slowness data may be performed where spikes 800 in the slowness profiles may be substituted with the normal values in the other slowness profiles. The correction result is shown in FIG. 12. In examples, the depth may be approximately corrected by the difference in first data set 1100, second data set 1102, and normal slowness values. Spike 800 slowness at depth D (wherein the variables in $s\ln_D^{GEO}$ may be removed) may be computed below:

$$s\ln_D^{\prime GEO} = \frac{t_{D+25+\delta d} - t_{D-25}}{dist_{D+25+\delta d} - dist_{D-25}}. \quad (6)$$

Figure 13A:
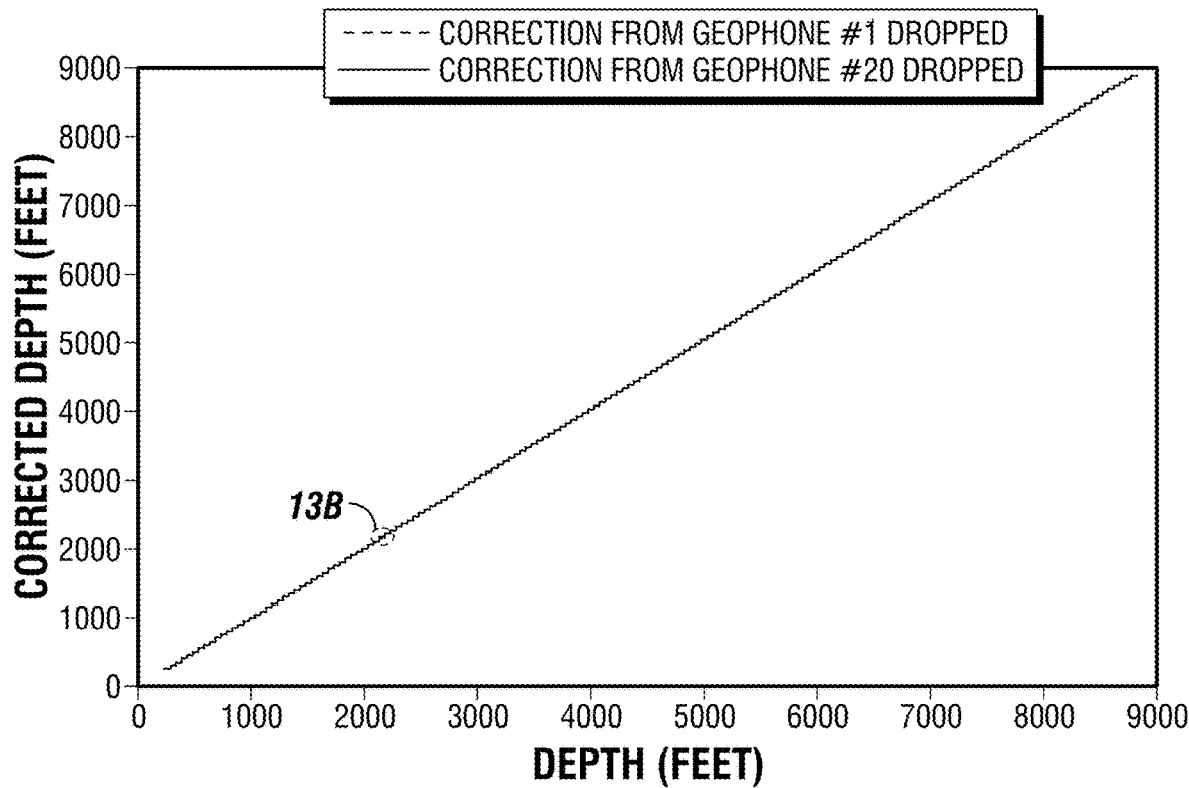
FIGS. 13a and 13b is an example of another graph of measured values with corrected recorded slowness for a last geophone or a first geophone.
Figure 13B:
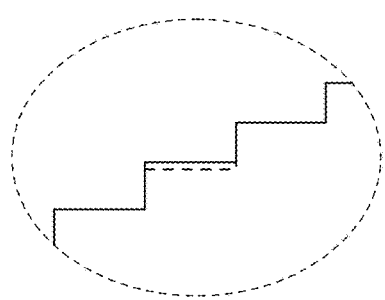

From Equations (2) and (6), δd may be calculated for each overlapped geophone 128. In examples, the correction of depth δd for overlapping channels may be similar from shallow to deep section. FIG. 12 illustrate the differences in dropping the first geophone 702 and retaining the last geophone 700 (Referring to FIGS. 7*b* and 7*c*) or vice versa. For tension-free cable or cable with uniformly distributed tension, δd may be exactly the same for the two cases. Therefore, the corrected depth in the two cases may be expected to be very similar except for the channel number being corrected. As illustrated in FIGS. 13*a* and 13*b*, the first line may illustrate depth correction dropping the last geophone 700 and dropping the first geophone 702. Both lines converge after the correction area. Thus, there may be no observable divergence of the depths of geophones 128 for two datasets.

Figure 14:
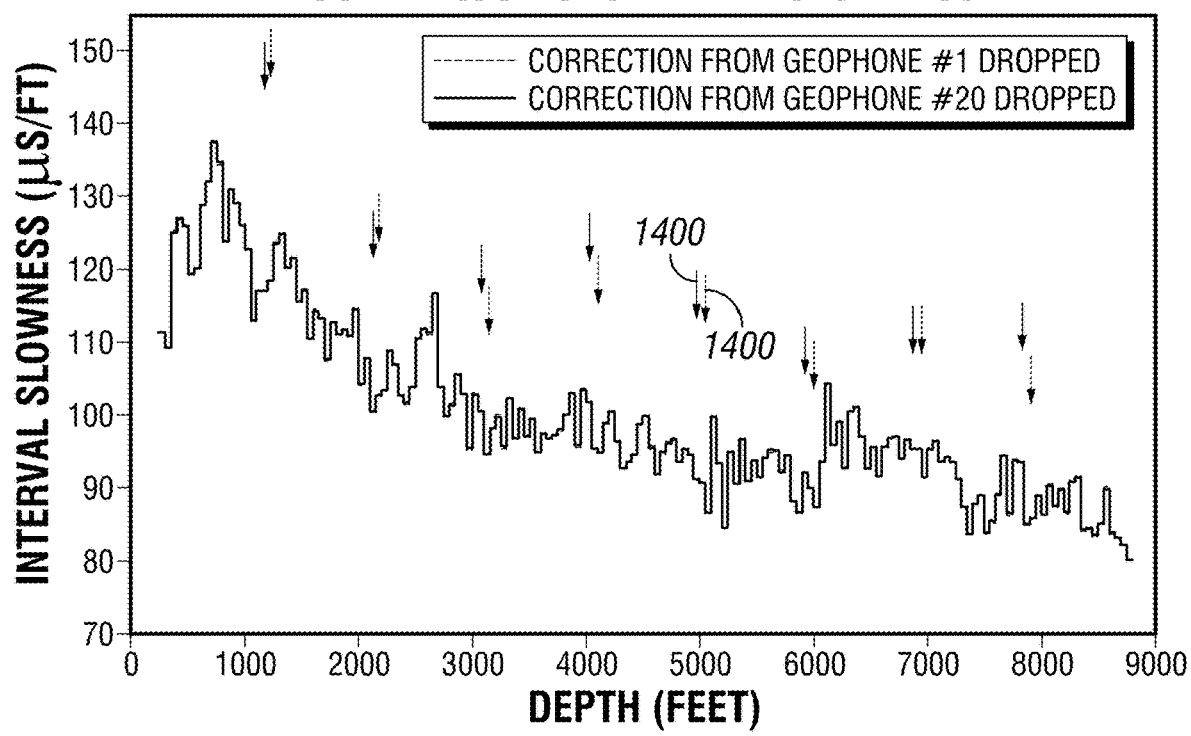
FIG. 14 is an example of a corrected graph of measured slowness through a formation.
Figure 15:
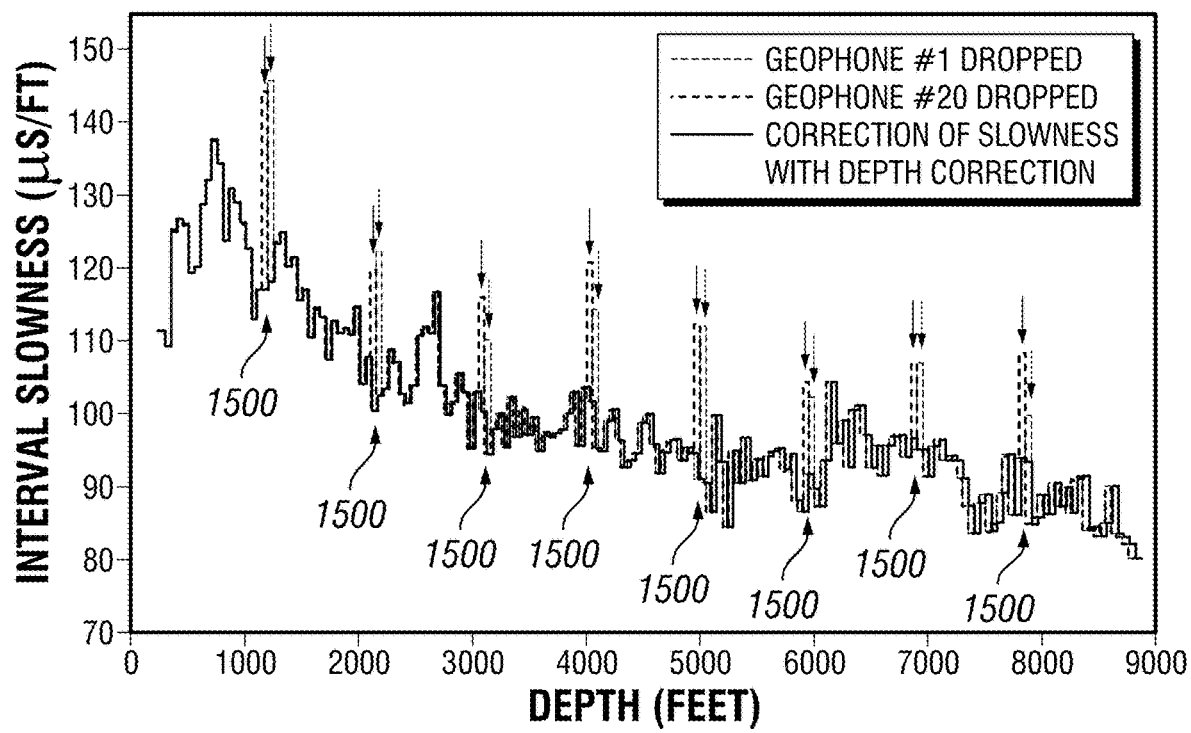
FIG. 15 is an example of a corrected graph of measured slowness through a formation with a depth shift.

The computed slowness profiles based on the corrected depth for the two cases are shown in FIG. 14. Arrows 1400 indicate the original positions of spikes 800 (Referring to FIG. 8), and they may be eliminated using the method described above. The slowness profiles corrected in the cases closely match each other. FIG. 15 overlays the average corrected slowness of FIG. 14 with the uncorrected slowness profiles of FIG. 11, which may be shown as a de-spike 1400, the effect of the corrected slowness profile by our approach. The corrected slowness profile in FIG. 15 has no spikes 1500 at deviation and may be accumulative from top to bottom, which may be reflected by gradually staggered depths of the correct and uncorrected slowness. The accumulative depth drift may be reasonable because the tension by cable gravity or mud friction may be positively related to the length of the cable, i.e., the deeper geophones 128 may be disposed, the more deviated their depth may be from the ideal depth. Overlaying the slowness correction results with depth correction as further illustrated in FIG. 15. Both approaches are effective to correct the depth error between measurements of geophone array 102 at a first location and/or a second location, thus are able to suppress spikes 800 (Referring to FIG. 8) in slowness profiles computed from geophone array 102 data.

Figure 16:
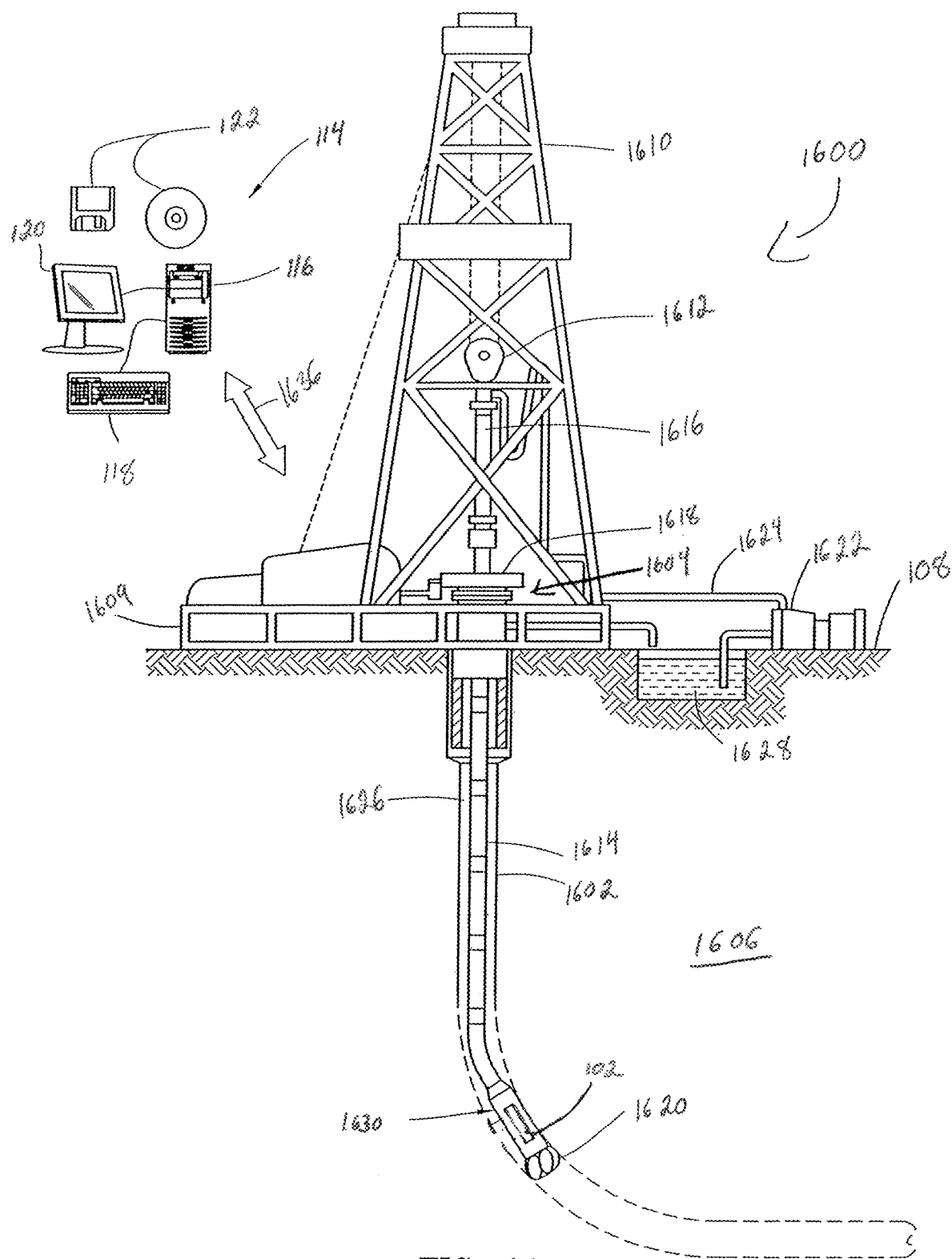
FIG. 16 is a schematic illustration of a logging while drilling system.

FIG. 16 illustrates an example in which geophone array 102 (Referring to FIG. 1) may be disposed in a drilling system 1600. As illustrated, wellbore 1602 may extend from a wellhead 1604 into a subterranean formation 1606 from surface 108 (Referring to FIG. 1). Generally, wellbore 1602 may include horizontal, vertical, slanted, curved, and other types of wellbore geometries and orientations. Wellbore 1602 may be cased or uncased. In examples, wellbore 1602 and may comprise a metallic material. By way of example, the metallic member may be a casing, liner, tubing, or other elongated steel tubular disposed in wellbore 1602.

As illustrated, wellbore 1602 may extend through subterranean formation 1606. As illustrated in FIG. 16, wellbore 1602 may extending generally vertically into the subterranean formation 1606, however wellbore 1602 may extend at an angle through subterranean formation 1606, such as horizontal and slanted wellbores. For example, although FIG. 16 illustrates a vertical or low inclination angle well, high inclination angle or horizontal placement of the well and equipment may be possible. It should further be noted that while FIG. 16 generally depicts a land-based operation, those skilled in the art may recognize that the principles described herein are equally applicable to subsea operations that employ floating or sea-based platforms and rigs, without departing from the scope of the disclosure.

As illustrated, a drilling platform 1609 may support a derrick 1610 having a traveling block 1612 for raising and lowering drill string 1614. Drill string 1614 may include, but is not limited to, drill pipe and coiled tubing, as generally known to those skilled in the art. A kelly 1616 may support drill string 1614 as it may be lowered through a rotary table 1618. A drill bit 1620 may be attached to the distal end of drill string 1614 and may be driven either by a downhole motor and/or via rotation of drill string 1614 from surface 108. Without limitation, drill bit 1620 may include, roller cone bits, PDC bits, natural diamond bits, any hole openers, reamers, coring bits, and the like. As drill bit 1620 rotates, it may create and extend wellbore 1602 that penetrates various subterranean formations 1606. A pump 1622 may circulate drilling fluid through a feed pipe 1624 to kelly 1616, downhole through interior of drill string 1614, through orifices in drill bit 1620, back to surface 108 via annulus 1626 surrounding drill string 1614, and into a retention pit 1628.

With continued reference to FIG. 16, drill string 1614 may begin at wellhead 1604 and may traverse wellbore 1602. Drill bit 1620 may be attached to a distal end of drill string 1614 and may be driven, for example, either by a downhole motor and/or via rotation of drill string 1614 from surface 108. Drill bit 1620 may be a part of bottom hole assembly 1630 at distal end of drill string 1614. Bottom hole assembly 1630 may further comprise geophone array 102. Geophone array 102 may be disposed on the outside and/or within bottom hole assembly 1630. Geophone array 102 may comprise a plurality of geophones 128 (Referring to FIG. 1). Geophone array 102 and/or the plurality of geophones 128 may operate and/or function as described above. As will be appreciated by those of ordinary skill in the art, bottom hole assembly 130 may be a measurement—while drilling (MWD) or logging-while-drilling (LWD) system.

Without limitation, bottom hole assembly 1630, geophone array 102, and/or the plurality of geophones 128 may be connected to and/or controlled by information handling system 114 (Referring to FIG. 1), which may be disposed on surface 108. Without limitation, information handling system 114 may be disposed down hole in bottom hole assembly 1630. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 1630 may be brought to surface 108. In examples, information handling system 114 may communicate with bottom hole assembly 1630 through a communication line (not illustrated) disposed in (or on) drill string 1614. In examples, wireless communication may be used to transmit information back and forth between information handling system 114 and bottom hole assembly 1630. Information handling system 114 may transmit information to bottom hole assembly 1630 and may receive as well as process information recorded by bottom hole assembly 1630. In examples, a downhole information handling system (not illustrated) may include, without limitation, a microprocessor or other suitable circuitry, for estimating, receiving and processing signals from bottom hole assembly 1630. Downhole information handling system (not illustrated) may further include additional components, such as memory, input/output devices, interfaces, and the like. In examples, while not illustrated, bottom hole assembly 1630 may include one or more additional components, such as analog-to-digital converter, filter and amplifier, among others, that may be used to process the measurements of bottom hole assembly 1630 before they may be transmitted to surface 108. Alternatively, raw measurements from bottom hole assembly 1630 may be transmitted to surface 108.

Any suitable technique may be used for transmitting signals from bottom hole assembly 1630 to surface 108, including, but not limited to, wired pipe telemetry, mud-pulse telemetry, acoustic telemetry, and electromagnetic telemetry. While not illustrated, bottom hole assembly 1630 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 1636, which may be a wired or wireless link. The telemetry data may be analyzed and processed by information handling system 114.

As illustrated, communication link 1636 (which may be wired or wireless, for example) may be provided that may transmit data from bottom hole assembly 1630 to an information handling system 114 at surface 108. Information handling system 114 may include a processing unit 116 (Referring to FIG. 1), a monitor 120 (Referring to FIG. 1), an input device 118 (e.g., keyboard, mouse, etc.) (Referring to FIG. 1), and/or computer media 122 (e.g., optical disks, magnetic disks) (Referring to FIG. 1) that may store code representative of the methods described herein. In addition to, or in place of processing at surface 108, processing may occur downhole.

This method and system may include any of the various features of the compositions, methods, and system disclosed herein, including one or more of the following statements.

Statement 1: A method for processing a slowness profile comprising: disposing a geophone array into a borehole; positioning the geophone array at a first location within the borehole; positioning the geophone array at a second location within the borehole; recording a vertical seismic profiling dataset, wherein vertical seismic profiling comprises a dataset of the acoustic wave recorded by the geophone array at the first location within the borehole and the acoustic wave recorded by the geohpone array at the second location within the borehole; picking a first gap travel time from the vertical seismic profiling dataset; and determining the slowness profile, wherein the slowness profile comprises determining a slowness of the acoustic wave through a formation by the geophone arrays.

Statement 2: The method of statement 1, further comprising computing a standard deviation of spatial derivative of the slowness profile of the acoustic wave recorded at the first location or the second location and producing the slowness profile of the acoustic wave.

Statement 3: The method of any preceding statement, further comprising identifying at least one gap in the slowness profile.

Statement 4: The method of any preceding statement, further comprising identifying at least one gap in the slowness profile and processing the slowness recorded by a last geophone of the geophone array at the first location and a first geophone of the geophone array at the second location.

Statement 5: The method of any preceding statement, comprising determining a depth of the last geophone of the geophone array at the first location and a depth of the first geophone of the geophone at the second location from the slowness recorded.

Statement 6: The method of any preceding statement, further comprising processing the recorded slowness at a last geophone disposed on the geophone array at the first location and at a first geophone disposed on the geophone array at the second location to determine a depth of the last geophone and the first geophone.

Statement 7: The method of any preceding statement, further comprising comparing a difference in the depth of the last geophone and the depth of the first geophone, comparing the difference in the depth to a spacing between the geophones of the geophone array at the first location and the geophone array at the second location, and correcting the slowness profile to account for the difference between the depth and the spacing.

Statement 8: The method of any preceding statement, further comprising processing the slowness at a last geophone disposed on the geophone array at the first location and at a first geophone disposed on the geophone array at the second location to produce another slowness profile and identifying at least one spike in the slowness profile.

Statement 9: The method of any preceding statement, wherein the spike comprises the slowness values of the datasets where the last geophone of the geophone array at the first location or the first geophone of geophone array at the second location is removed.

Statement 10: The method of any preceding statement, wherein the seismic source comprises an air gun.

Statement 11: The method of any preceding statement, further comprising processing the slowness at a last geophone disposed on the geophone array at the first location and at a first geophone disposed on the geophone array at the second location to determine a depth of the last geophone and the first geophone, and wherein the geophone array at the first location and the geophone array at the second location are overlapping.

Statement 12: The method of any preceding statement, comprising removing the slowness from a last geophone of the geophone array at the first location and calculating the slowness profile and removing the slowness from a first geophone of the geophone array at the second location and calculating the spatial derivative of slowness profile when the last geophone location and the first geophone are overlapping.

Statement 13: A well system comprising: a geophone array, comprising a plurality of geophones; and an information handling system, wherein the information handling system is operable to record a slowness profile, wherein the slowness profile comprises a recordings of a slowness of acoustic waves through a formation by the geophone array at a first location and at a second location.

Statement 14: The well system of statement 13, wherein the information handling system is operable to compute recorded slowness of the acoustic waves recorded by the geophone array at the first location and at the second location to produce the slowness profile of the recorded slowness of the acoustic wave.

Statement 15: The well system of statement 13 or statement 14, wherein the information handling system is operable to identify at least one gap in the slowness profile.

Statement 16: The well system of any one of statements 13 to 15, wherein the information handling system is operable to remove the recorded slowness from the geophone array at the second location and calculate the slowness profile.

Statement 17: The well system of any one of statements 13 to 16, wherein the information handling system is operable to remove the recorded slowness from the geophone array at the first location and calculate the slowness profile.

Statement 18: The well system of any one of statements 13 to 17, wherein the information handling system is operable to process the recorded slowness at a last geophone disposed on the geophone array at the first location or at a first geophone disposed on the geophone array at the second location to produce the slowness profile and identify a spike in the slowness profile.

Statement 19: The well system of any one of statements 13 to 19, wherein the spike comprises a first data set without using the last geophone and a second data set without using the first geophone.

Statement 20: The well system of any one of statements 13 to 20, wherein the information handling system is operable to process the recorded slowness at a last geophone disposed on the geophone array at the first location and at a first geophone disposed on the geophone array at the second location to determine a depth of the last geophone and the first geophone, and wherein the geophone array at the first location and the geophone array at the second location are overlapping. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

We claim:

1. A method for processing a slowness profile comprising:
disposing a geophone array into a borehole;
positioning the geophone array at a first location within the borehole;
positioning the geophone array at a second location within the borehole;
recording a vertical seismic profiling dataset, wherein vertical seismic profiling comprises a dataset of the acoustic wave recorded by the geophone array at the first location within the borehole and the acoustic wave recorded by the geophone array at the second location within the borehole;
picking a first gap travel time from the vertical seismic profiling dataset; and
determining the slowness profile, wherein the slowness profile comprises determining a slowness of the acoustic wave through a formation by the geophone arrays.

2. The method of claim 1, further comprising computing a standard deviation of spatial derivative of the slowness profile of the acoustic wave recorded at the first location or the second location and producing the slowness profile of the acoustic wave.

3. The method of claim 1, further comprising identifying at least one gap in the slowness profile.

4. The method of claim 1, further comprising identifying at least one gap in the slowness profile and processing the slowness recorded by a last geophone of the geophone array at the first location and a first geophone of the geophone array at the second location.

5. The method of claim 4, comprising determining a depth of the last geophone of the geophone array at the first location and a depth of the first geophone of the geophone at the second location from the slowness recorded.

6. The method of claim 1, further comprising processing the recorded slowness at a last geophone disposed on the geophone array at the first location and at a first geophone disposed on the geophone array at the second location to determine a depth of the last geophone and the first geophone.

7. The method of claim 6, further comprising comparing a difference in the depth of the last geophone and the depth of the first geophone, comparing the difference in the depth to a spacing between the geophones of the geophone array at the first location and the geophone array at the second location, and correcting the slowness profile to account for the difference between the depth and the spacing.

8. The method of claim 1, further comprising processing the slowness at a last geophone disposed on the geophone array at the first location and at a first geophone disposed on the geophone array at the second location to produce another slowness profile and identifying at least one spike in the slowness profile.

9. The method of claim 8, wherein the spike comprises the slowness values of the datasets where the last geophone of the geophone array at the first location or the first geophone of geophone array at the second location is removed.

10. The method of claim 1, wherein the seismic source comprises an air gun.

11. The method of claim 1, further comprising processing the slowness at a last geophone disposed on the geophone array at the first location and at a first geophone disposed on the geophone array at the second location to determine a depth of the last geophone and the first geophone, and wherein the geophone array at the first location and the geophone array at the second location are overlapping.

12. The method of claim 1, comprising removing the slowness from a last geophone of the geophone array at the first location and calculating the slowness profile and removing the slowness from a first geophone of the geophone array at the second location and calculating the spatial derivative of slowness profile when the last geophone location and the first geophone are overlapping.

13. A well system comprising:
a geophone array, comprising a plurality of geophones; and
an information handling system, wherein the information handling system is operable to record a slowness profile, wherein the slowness profile comprises at least one recordings of a slowness of acoustic waves through a formation by the geophone array at a first location and at a second location, wherein the information handling system is operable to identify at least one gap in the slowness profile.

14. The well system of claim 13, wherein the information handling system is operable to compute recorded slowness of the acoustic waves recorded by the geophone array at the first location and at the second location to produce the slowness profile of the recorded slowness of the acoustic wave.

15. The well system of claim 13, wherein the information handling system is operable to remove the recorded slowness from the geophone array at the second location and calculate the slowness profile.

16. The well system of claim 13, wherein the information handling system is operable to remove the recorded slowness from the geophone array at the first location and calculate the slowness profile.

17. The well system of claim 13, wherein the information handling system is operable to process the recorded slowness at a last geophone disposed on the geophone array at the first location or at a first geophone disposed on the geophone array at the second location to produce the slowness profile and identify a spike in the slowness profile.

18. The well system of claim 17, wherein the spike comprises a first data set without using the last geophone and a second data set without using the first geophone.

19. The well system of claim 13, wherein the information handling system is operable to process the recorded slowness at a last geophone disposed on the geophone array at the first location and at a first geophone disposed on the geophone array at the second location to determine a depth of the last geophone and the first geophone, and wherein the geophone array at the first location and the geophone array at the second location are overlapping.

* * * * *

UNITED STATES PATENT AND TRADEMARK OFFICE
CERTIFICATE OF CORRECTION

PATENT NO. : 11,249,210 B2
APPLICATION NO. : 16/062053
DATED : February 15, 2022
INVENTOR(S) : Xiang Wu, Mark Elliott Willis and Oscar Augusto Barrios Page 1 of 1

It is certified that error appears in the above-identified patent and that said Letters Patent is hereby corrected as shown below:

In the Claims

Column 15 Claim 13, Line 23 delete "recordings" and replace with --recording--

Signed and Sealed this
Fifth Day of April, 2022

Drew Hirshfeld
*Performing the Functions and Duties of the
Under Secretary of Commerce for Intellectual Property and
Director of the United States Patent and Trademark Office*